(12) United States Patent
Chen et al.

(10) Patent No.: US 9,602,671 B2
(45) Date of Patent: Mar. 21, 2017

(54) METHOD AND TERMINAL DEVICE FOR TELEPHONE CALL TRANSFER

(71) Applicant: Xiaomi Inc., Beijing (CN)

(72) Inventors: Zhijun Chen, Beijing (CN); Hu Zang, Beijing (CN); Lin Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 33 days.

(21) Appl. No.: 14/666,313

(22) Filed: Mar. 24, 2015

(65) Prior Publication Data

US 2016/0036988 A1 Feb. 4, 2016

Related U.S. Application Data

(63) Continuation of application No. PCT/CN2014/091747, filed on Nov. 20, 2014.

(30) Foreign Application Priority Data

Jul. 29, 2014 (CN) .......................... 2014 1 0366029

(51) Int. Cl.
*H04M 3/42* (2006.01)
*H04M 3/58* (2006.01)
(Continued)

(52) U.S. Cl.
CPC ............. *H04M 3/58* (2013.01); *H04M 1/006* (2013.01); *H04M 1/57* (2013.01); *H04W 4/16* (2013.01)

(58) Field of Classification Search
CPC .......... H04M 3/58; H04M 1/57; H04M 1/006; H04W 4/16
(Continued)

(56) References Cited

U.S. PATENT DOCUMENTS

2002/0146105 A1 10/2002 McIntyre
2004/0114730 A1 6/2004 Koch et al.
(Continued)

FOREIGN PATENT DOCUMENTS

CN 1553687 A 12/2004
CN 1625199 A 6/2005
(Continued)

OTHER PUBLICATIONS

"International Search Report for PCT/CN2014/091747".
The extended European search report for 15175502.2.

*Primary Examiner* — Shahriar Behnamian
(74) *Attorney, Agent, or Firm* — Jun He Law Offices P.C.; James J. Zhu

(57) ABSTRACT

A method and terminal device for transferring a telephone call, are provided. The method comprises: detecting if an incoming call is received; displaying an incoming call interactive interface containing an incoming call transferring option, if the incoming call is detected; transferring the incoming call to a terminal device corresponding to a designated number when the incoming call transferring option is chosen. As the user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

8 Claims, 11 Drawing Sheets

(51) Int. Cl.
*H04W 4/16* (2009.01)
*H04M 1/00* (2006.01)
*H04M 1/57* (2006.01)

(58) Field of Classification Search
USPC .................................................. 455/417–420
See application file for complete search history.

(56) References Cited

U.S. PATENT DOCUMENTS

| | | |
|---|---|---|
| 2005/0153699 A1 | 7/2005 | Kent, Jr. et al. |
| 2006/0203986 A1 | 9/2006 | Gibson |
| 2012/0106728 A1* | 5/2012 | Ghaffari ............ H04M 3/42272 |
| | | 379/211.02 |

FOREIGN PATENT DOCUMENTS

| | | |
|---|---|---|
| CN | 1625200 A | 6/2005 |
| CN | 102045458 A | 5/2011 |
| CN | 102291502 A | 12/2011 |
| CN | 102883292 A | 1/2013 |
| EP | 2493137 A1 | 8/2012 |
| JP | 4-000843 A | 1/1992 |
| KR | 1020080033579 A | 4/2008 |
| KR | 1020080033688 A | 4/2008 |
| RU | 2004121809 A | 1/2006 |
| SU | 1354439 A2 | 11/1987 |
| WO | 2012163182 A1 | 12/2012 |
| WO | 2013/031501 A1 | 3/2013 |

* cited by examiner

METHOD AND TERMINAL DEVICE FOR TELEPHONE CALL TRANSFER

CROSS-REFERENCE TO RELATED APPLICATIONS

This application is a Continuation Application of International Application No. PCT/CN2014/091747, filed on Nov. 20, 2014, based on and claims priority to Chinese Patent Application No. 201410366029.1, filed on Jul. 29, 2014, the entire contents of which are incorporated herein by reference.

TECHNICAL FIELD

The present disclosure relates to the field of communication technology, and more particularly, to a method and terminal device for transferring a telephone call.

BACKGROUND

With the development of communication technology, more and more people communicate by terminal devices such as mobile phones. In order to timely process an incoming phone call when it is not convenient for a user to answer, an implementation of call transfer on the terminal device becomes a major issue in improving user's communication experience.

The related technology provides a method for transferring a telephone call. In the method, the incoming call will be transferred automatically when a call transfer function is enabled in advance and conditions for transferring the call, such as busy line, no answer for a period of time, or the phone call is not able to be connected, are met.

SUMMARY

In accordance with a first aspect of the present disclosure, there is provided a method for transferring a telephone call. The method comprises: detecting if an incoming call is received; displaying an incoming call interactive interface containing an incoming call transferring option, if the incoming call is detected; transferring the incoming call to a terminal device corresponding to a designated number when the incoming call transferring option is chosen.

According to a second aspect of the present disclosure, there is provided a terminal device for transferring a telephone call. The terminal device comprises: a processor; and a memory configured to store instructions executable by the processor, wherein the processor is configured to perform: detecting if an incoming call is received; displaying an incoming call interactive interface containing an incoming call transferring option, if the incoming call is detected; transferring the incoming call to a terminal device corresponding to a designated number when the incoming call transferring option is chosen.

In accordance with a third aspect of the present disclosure, there is provided a non-transitory computer-readable storage medium comprising instructions, executable by a processor in a terminal, for performing a method for transferring a telephone call. The method comprises: a processor; and a memory configured to store instructions executable by the processer, wherein the processer is configured to perform: detecting if an incoming call is received; displaying an incoming call interactive interface containing an incoming call transferring option, if the incoming call is detected; transferring the incoming call to a terminal device corresponding to a designated number when the incoming call transferring option is chosen.

After the incoming call is detected, the incoming call interactive interface containing the incoming call transferring option is displayed, and the incoming call is transferred to the terminal device corresponding to the designated number when the incoming call transferring option is chosen. As a user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
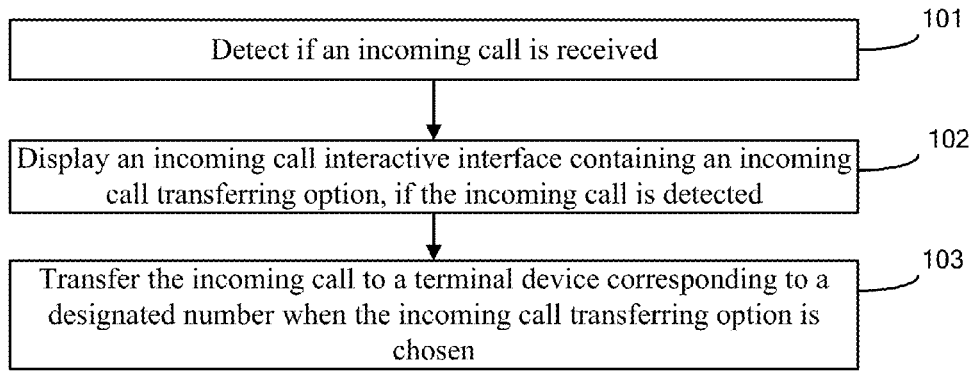
FIG. 1 is a flow chart illustrating a method for transferring a telephone call according to an exemplary embodiment.

FIG. 1 is a flow chart illustrating a method for transferring a telephone call according to an exemplary embodiment. The method for transferring a telephone call is for use in terminal devices which is capable of receiving an incoming call. As shown in FIG. 1, the method for transferring a telephone call includes the following steps.

In step 101, it is detected if the incoming call is received.

In step 102, the incoming call interactive interface containing an incoming call transferring option is displayed, if the incoming call is detected.

In step 103, the incoming call is transferred to the terminal device corresponding to a designated number when the incoming call transferring option is chosen.

In an optional embodiment, prior to transferring the incoming call to the terminal device corresponding to the designated number, the method further includes the following two steps.

At first, a designated number obtaining interface is displayed, wherein the designated number obtaining interface contains a number input box.

Then a number inputted by the user in the number input box of the designated number obtaining interface is obtained, and the number inputted by the user is determined as the designated number confirmed by the user.

In another optional embodiment, prior to transferring the incoming call to the terminal device corresponding to the designated number, the method further includes the following two steps.

At first, a designated number obtaining interface is displayed, wherein the designated number obtaining interface contains one or more preset numbers.

Then, the number chosen by the user is detected from the preset numbers displayed on the designated number obtaining interface, and the number chosen by the user is determined as the designated number confirmed by the user.

In an optional embodiment, prior to displaying the designated number obtaining interface, the method further includes the following two steps.

At first, one or more preset numbers which are preset by the user are obtained.

Then, the designated number obtaining interface is displayed. Herein the designated number obtaining interface which contains one or more preset numbers is displayed.

In an optional embodiment, the step of obtaining one or more preset numbers includes the step of displaying the preset number input box, and obtaining the preset number inputted by the user in the preset number input box. Or, the step of obtaining one or more preset numbers includes displaying numbers included in the user's contacts (or address book), and determining the number chosen by the user from the numbers contained in the address book as the preset number.

The method provided by the present disclosed embodiment detects if the incoming call is received, displays the incoming call interactive interface containing the incoming call transferring option after detecting the incoming call is detected, and transfers the incoming call to the terminal device corresponding to the designated number when the incoming call transferring option is chosen. As the user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

Figure 2:
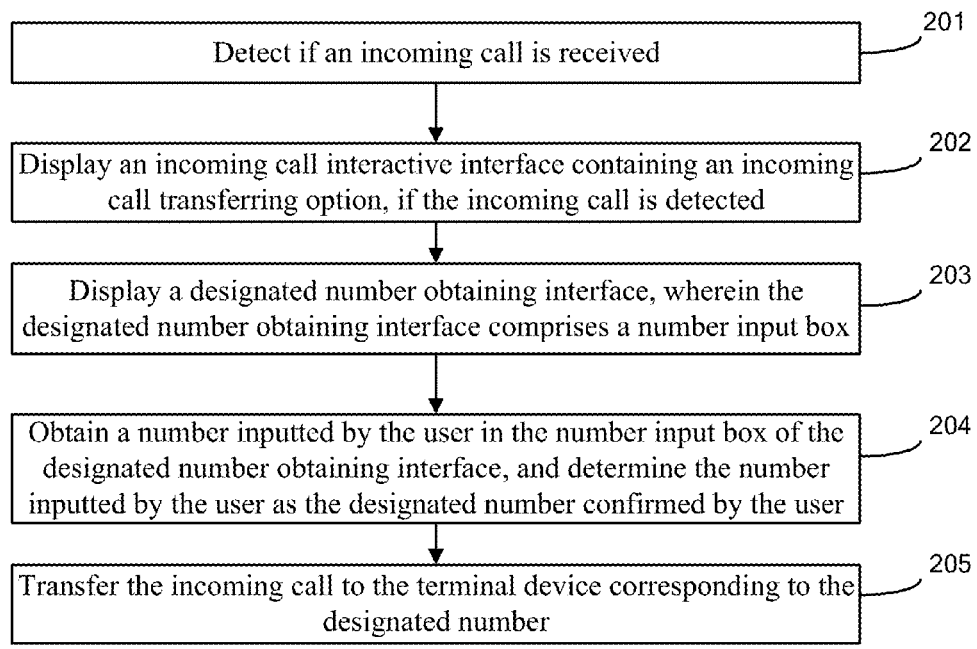
FIG. 2 is a flow chart illustrating a method for transferring a telephone call according to an exemplary embodiment.

FIG. 2 is a flow chart illustrating a method for transferring a telephone call according to an exemplary embodiment. As shown in FIG. 2, the method for transferring a telephone call is for use in the terminal device which is capable of receiving an incoming call. The method for transferring a telephone call includes the following steps.

In step 201, it is detected if the incoming call is received.

The embodiment does not limit particularly the manner of how to detect if the incoming call is received, which includes but is not limited to detecting by wireless communication technology used by combining the terminal device and communication module inside the terminal device.

In step 202, the incoming call interactive interface containing an incoming call transferring option is displayed, if the incoming call is detected.

The embodiment does not limit the contents displayed on the incoming call interactive interface, which includes but is not limited to the answering option, the rejecting option and the call transferring option. Optionally, in order to make the user know who is calling him/her, the terminal device could determine the corresponding contact person according to the detected incoming call, so that the incoming call's contact information may be displayed on the incoming call interactive interface. The embodiment does not limit it hereto.

Figure 3:
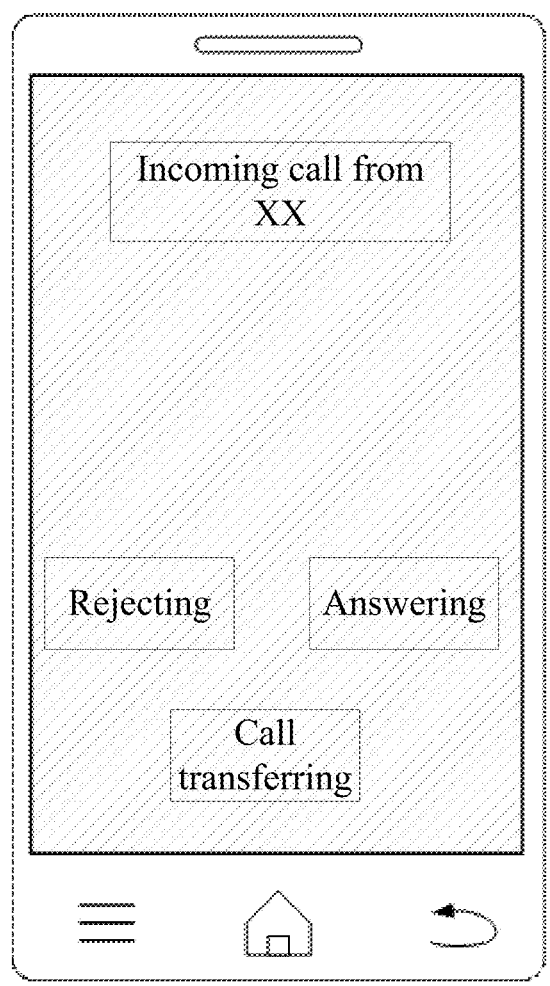
FIG. 3 is a diagram illustrating an incoming call interactive interface according to an exemplary embodiment.

For instance, as shown in FIG. 3, the uppermost part of the interface in FIG. 3 displays the incoming call's contact information. Additionally, it displays the answering option, the rejecting option and the incoming call transferring option at the bottom part of the interface. The user may carry out different operation by pressing the three options displayed in FIG. 3. The embodiment does not limit it hereto. For example, the user could receive the incoming call when he/she presses the answering option, the user could reject the incoming call when he/she presses the rejecting option, and the user could transfer the incoming call when he/she presses the incoming call transferring option.

In step 203, the designated number obtaining interface is displayed, wherein the designated number obtaining interface contains the number input box when the incoming call transferring option is chosen.

With the above step 202, after the incoming interactive interface containing the incoming call transferring option is displayed, because the incoming interactive interface contains the incoming call transferring option, the user may transfer the incoming call by choosing the incoming call transferring option. After it is detected that the incoming call transferring option is chosen, the terminal device may display the designated number obtaining interface, in which the number input box could be included. Of course, the designated number obtaining interface may further include other contents. The embodiment does not limit it hereto.

Figure 4:
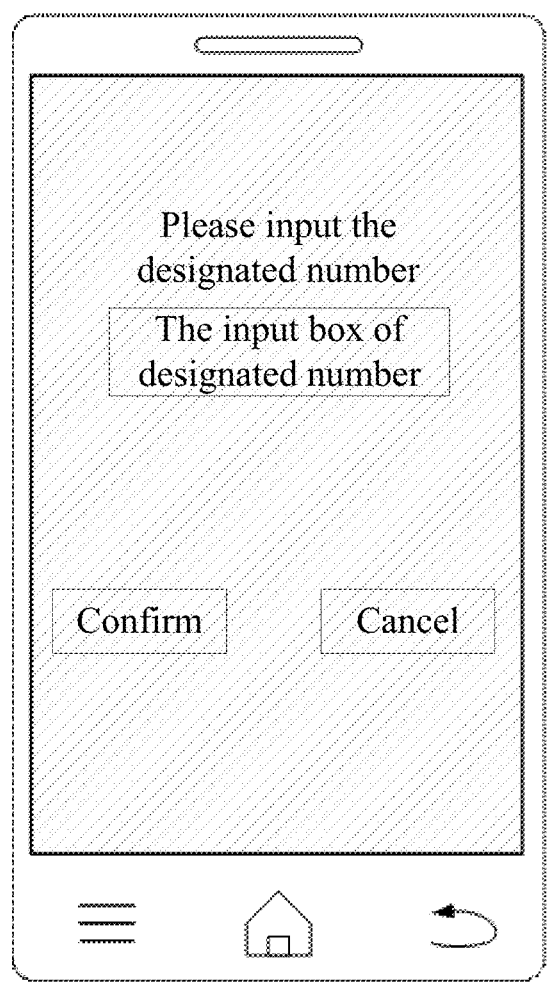
FIG. 4 is a diagram illustrating an incoming call interactive interface according to an exemplary embodiment.

For instance, as shown in FIG. 4, the designated number obtaining interface in FIG. 4 includes the number input box, the confirming option and the cancelling option.

In step 204, the number inputted by the user in the number input box of the designated number obtaining interface is obtained, and the number inputted by the user is determined as the designated number confirmed by the user.

The embodiment does not limit particularly the manner for obtaining the number inputted by the user in the number input box of the designated number obtaining interface, which includes but is not limited to: obtaining the designated number inputted by the user when it is detected that the user is inputting the designated number in the number input box of the designated number obtaining interface and pressing the confirming option. In addition, after the designated number inputted by the user is obtained, the input number by the user may be determined as the designated number confirmed by the user. The embodiment does not limit it hereto.

In step 205, the incoming call is transferred to the terminal device corresponding to the designated number.

The embodiment does not limit particularly the manner for transferring the incoming call to the terminal device corresponding to the designated number, which includes but is not limited to: determining the corresponding terminal device according to the designated number; transferring the incoming call to the terminal device corresponding to the designated number, and choosing by the user who is using the corresponding terminal device whether to answer the call. Wherein, when the incoming call is transferred to the terminal device corresponding to the designated number, the user who is using the corresponding terminal device may choose to answer or not answer the call. Of course, call transfer can also be chosen, which will not be limited by the embodiment. For detailed implementation procedure, please refer to the contents of above steps of the present embodiment, which is not described redundantly herein.

The method provided by the present disclosed embodiment detects if the incoming call is received, displays the incoming call interactive interface containing the incoming call transferring option after detecting the incoming call is detected, and transfers the incoming call to the terminal device corresponding to the designated number when the incoming call transferring option is chosen. As the user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

Figure 5:
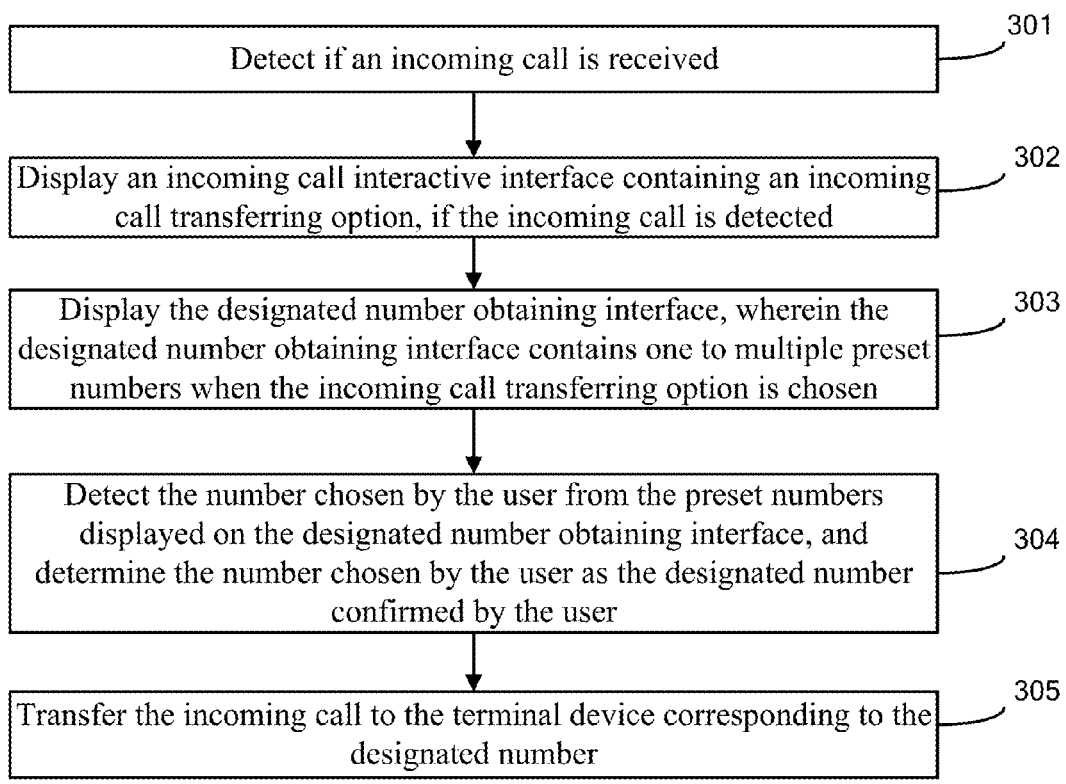
FIG. 5 is a flow chart illustrating a method for transferring a telephone call according to an exemplary embodiment.

FIG. 5 is a flow chart illustrating a method for transferring a telephone call according to an exemplary embodiment. As shown in FIG. 5, the method for transferring a telephone call is for use in the terminal device which is capable of receiving an incoming call. The method for transferring a telephone call includes the following steps.

In step 301, it is detected if the incoming call is received.

The embodiment does not limit particularly the manner of detecting if the incoming call is received. For detailed process, please refer to the contents of step 201 of the embodiment corresponding to FIG. 2, which is not described redundantly herein.

In step 302, the incoming call interactive interface containing the incoming call transferring option is displayed, if the incoming call is detected.

The embodiment does not limit particularly the manner for displaying the incoming call interactive interface containing the incoming call transferring option. For detailed process, please refer to the contents of step 202 of the embodiment corresponding to FIG. 2, which is not described redundantly herein.

In step 303, the designated number obtaining interface is displayed, wherein the designated number obtaining interface contains one or more preset numbers when the incoming call transferring option is chosen.

With the above step 202, after the incoming interactive interface containing the incoming call transferring option is displayed, because the incoming interactive interface contains the incoming call transferring option, the user may transfer the incoming call by choosing the incoming call transferring option. After it is detected that the incoming call transferring option is chosen, the terminal device may display the designated number obtaining interface. The embodiment does not limit particularly the manner for displaying the designated number obtaining interface, which includes but not is limited to: obtaining one or more numbers set by the user; displaying the obtaining interface of the designated number which includes one or more preset numbers. Wherein, except one or more preset numbers, other contents can also be contained on the designated number obtaining interface. The embodiment does not limit it hereto.

Figure 6:
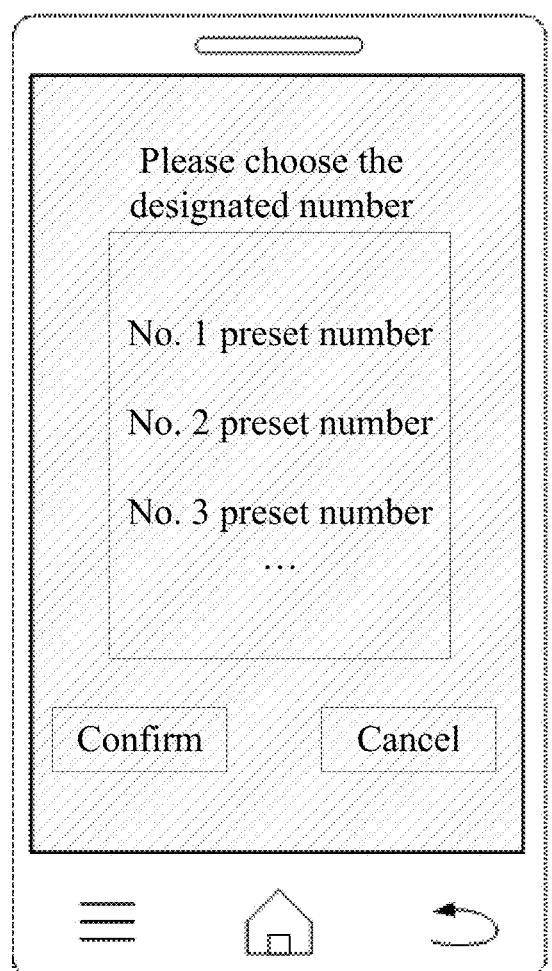
FIG. 6 is a diagram illustrating a designated number obtaining interface according to an exemplary embodiment.

For instance, as shown in FIG. 6, the designated number obtaining interface includes one or more preset numbers displayed in a list.

In addition, the embodiment does not limit particularly the manner for obtaining one or more numbers set by the user, which includes but not is limited to the following two obtaining manners.

The first obtaining manner: displaying the preset number input box, and obtaining the preset number inputted by the user in the preset number input box.

Figure 7:
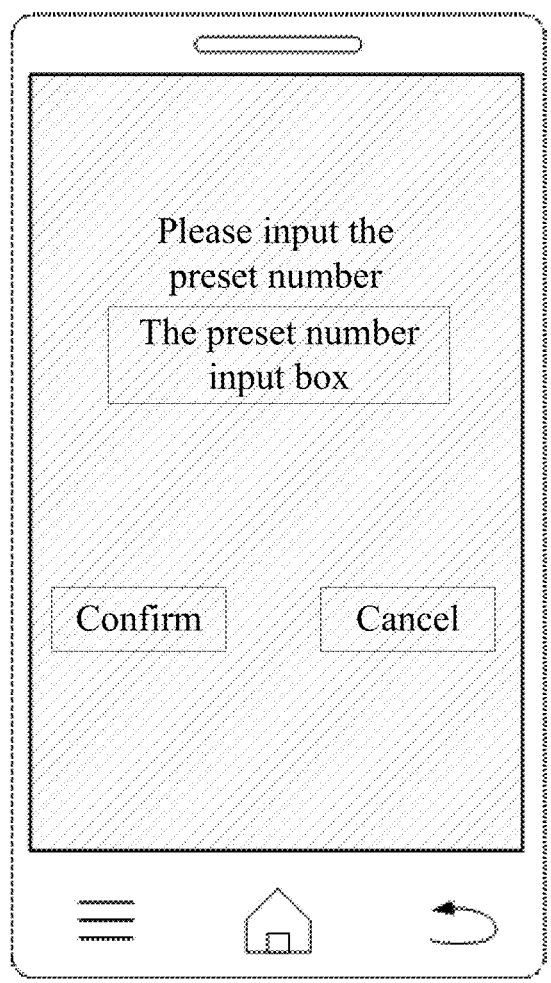
FIG. 7 is a diagram illustrating a preset number obtaining interface according to an exemplary embodiment.

Regarding the first obtaining manner, for instance, as shown in FIG. 7, the terminal device displays the preset number obtaining interface. Wherein, the displayed preset number obtaining interface contains the preset number input box, in which the preset number can be inputted by the user.

The second obtaining manner: displaying the number contained in the address book, and determining the number chosen by the user from the address book as the preset number.

Figure 8:
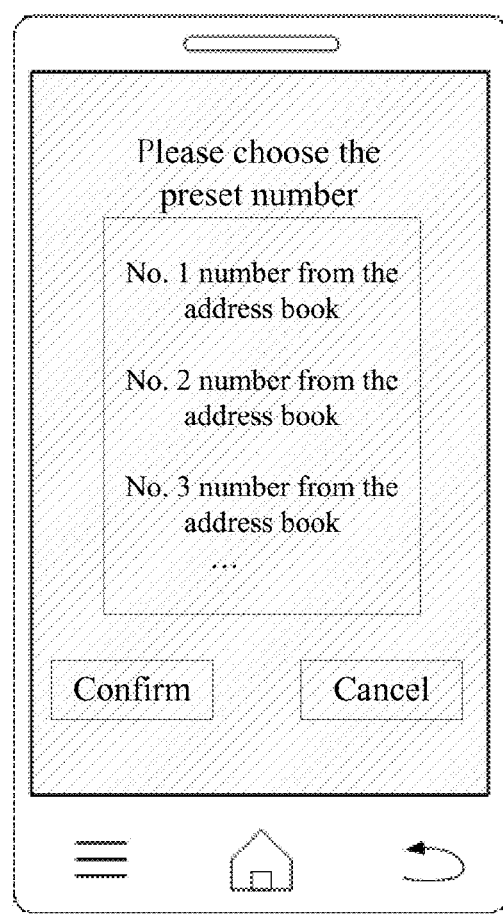
FIG. 8 is a diagram illustrating a preset number obtaining interface according to an exemplary embodiment.

Regarding the second obtaining manner, for instance, as shown in FIG. 8, the terminal device displays the preset number obtaining interface. All the numbers in the address book are displayed in the centre of the preset number obtaining interface. The user may choose from all the numbers in the address book so that the terminal device may determine the number chosen by the user as the preset number.

In step 304, it is detected the number chosen by the user from the preset numbers displayed on the designated number obtaining interface, and the number chosen by the user is determined as the designated number confirmed by the user.

Because the preset numbers displayed on the designated number obtaining interface can be displayed in a list and each item on the list corresponds to one preset number respectively, the embodiment does not limit particularly the manner for detecting the number chosen by the user from the preset numbers displayed on the designated number obtaining interface, which includes but is not limited to: detecting the item on the list which the user pressed; determining the preset number corresponding to the item on the list pressed by the user as the number chosen by the user. After the number chosen by the user from the preset numbers displayed on the designated number obtaining interface is detected, the number chosen by the user may be determined as the designated number confirmed by the user.

In step 305, the incoming call is transferred to the terminal device corresponding to the designated number.

The embodiment does not limit particularly the manner for transferring the incoming call to the terminal device corresponding to the designated number. For detailed process, please refer to the contents of step 205 of the present embodiment corresponding to FIG. 2, which is not described redundantly herein.

The method provided by the present disclosed embodiment detects if the incoming call is received, displays the incoming call interactive interface containing the incoming call transferring option after detecting the incoming call is detected, and transfers the incoming call to the terminal device corresponding to the designated number when the incoming call transferring option is chosen. As the user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

Figure 9:
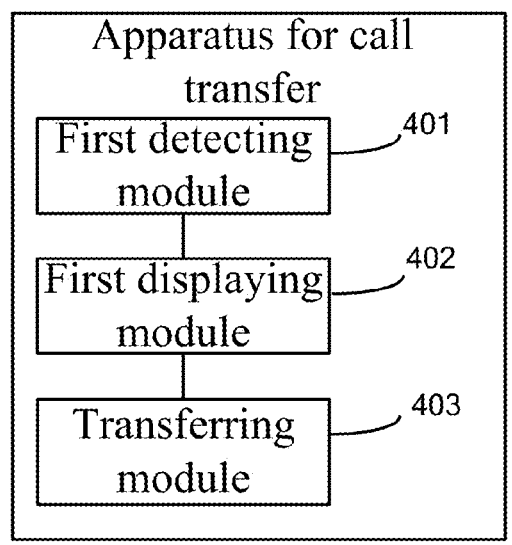
FIG. 9 is a block diagram illustrating an apparatus for transferring a telephone call according to an exemplary embodiment.

FIG. 9 is a block diagram illustrating an apparatus for transferring a telephone call according to an exemplary embodiment. The apparatus is for use in the terminal device which is capable of receiving an incoming call. The apparatus may be applied to implement the call transferring methods provided by any one of the embodiments corresponding to FIG. 1, FIG. 2 and FIG. 5. Referring to FIG. 9, the apparatus includes a first detecting module 401, a first displaying module 402, and a transferring module 403.

The first detecting module 401 is configured to detect if the incoming call is received.

The first displaying module 402 is configured to display the incoming call interactive interface containing the incoming call transferring option, when the incoming call is detected.

The transferring module 403 is configured to transfer the incoming call to the terminal device corresponding to the designated number.

Figure 10:
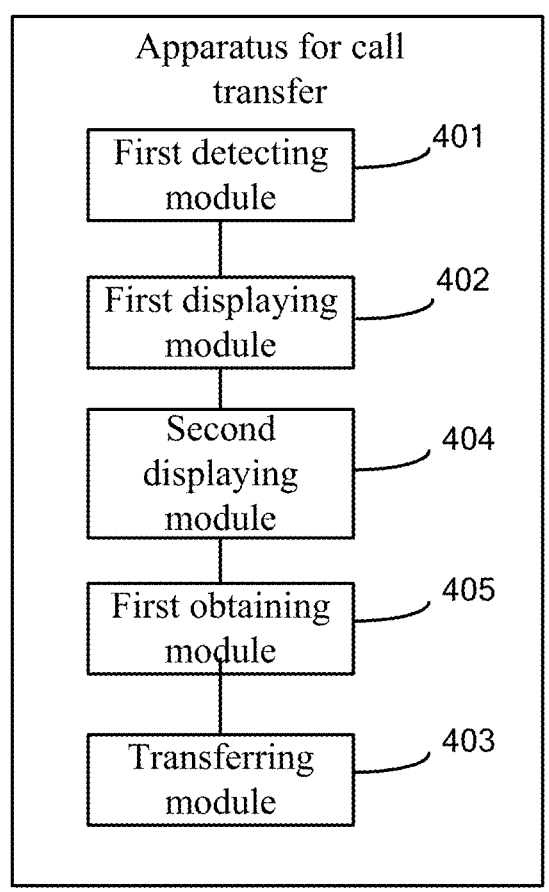
FIG. 10 is a block diagram illustrating an apparatus for transferring a telephone call according to an exemplary embodiment.

In one optional embodiment, referring to FIG. 10, the apparatus further includes a second displaying module 404 and a first obtaining module 405.

The second displaying module 404 is configured to display the designated number obtaining interface, wherein the designated number obtaining interface contains a number input box.

The first obtaining module 405 is configured to obtain the number inputted by the user in the number input box of the designated number obtaining interface, and determine the number inputted by the user as the designated number confirmed by the user.

Figure 11:
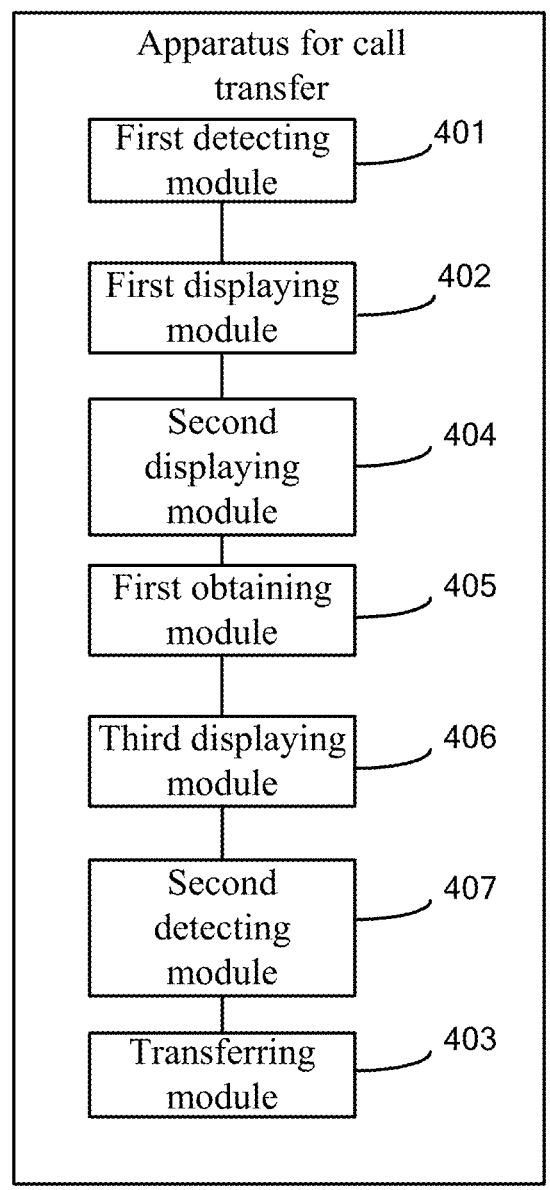
FIG. 11 is a block diagram illustrating an apparatus for transferring a telephone call according to an exemplary embodiment.

In one optional embodiment, referring to FIG. 11, the apparatus further includes a third displaying module 406 and a second detecting module 407.

The third displaying module 406 is configured to display the designated number obtaining interface, wherein the designated number obtaining interface contains one or more preset numbers.

The second detecting module 407 is configured to detect the number chosen by the user from the preset numbers displayed on the designated number obtaining interface, and determine the number chosen by the user as the designated number confirmed by the user.

Figure 12:
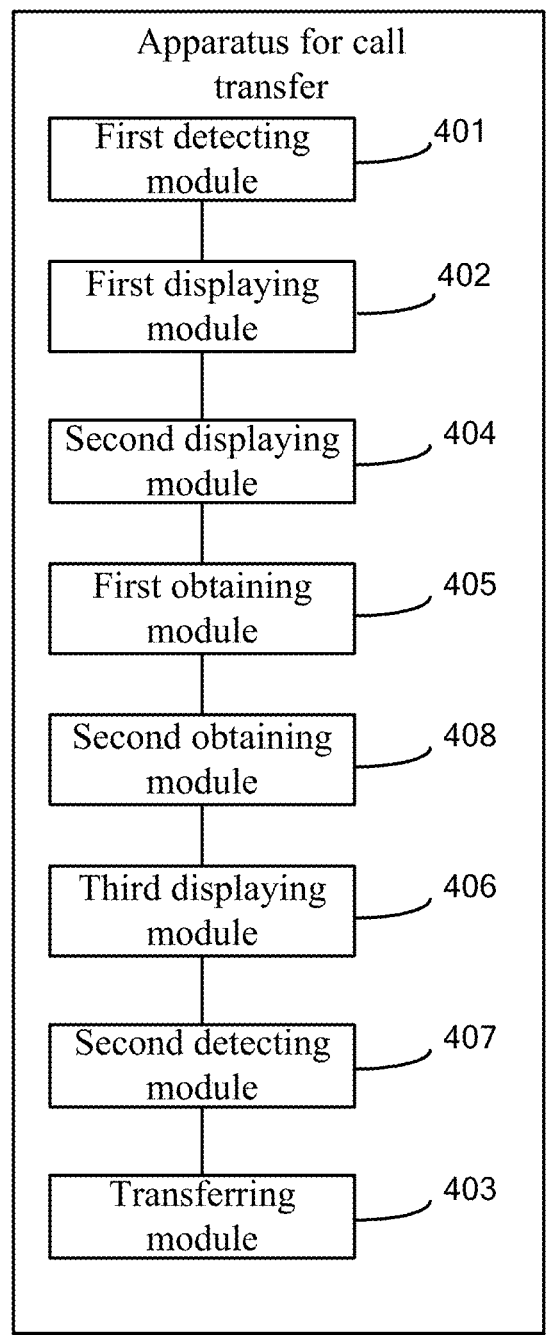
FIG. 12 is a block diagram illustrating an apparatus for transferring a telephone call according to an exemplary embodiment.

In one optional embodiment, referring to FIG. 12, the apparatus further includes a second obtaining module 408.

The second obtaining module 408 is configure to obtain one or more preset numbers which are preset by the user.

The third displaying module 406 is configured to display the designated number obtaining interface contains one or more preset numbers.

In one optional embodiment, the second obtaining module 408 is configured to display the preset number input box, and obtain the preset number inputted by the user in the preset number input box; or display numbers included in the user's address book, and determine the number chosen by the user from the numbers contained in the address book as the preset number.

The apparatus provided by the present disclosed embodiments detects if the incoming call is received, displays the incoming call interactive interface containing the incoming call transferring option after detecting the incoming call is detected, and transfers the incoming call to the terminal device corresponding to the designated number when the incoming call transferring option is chosen. As the user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

Regarding the apparatus in the above mentioned embodiments, the specific manner for carrying out an operation with respect to the respective modules has been made in the embodiment relative to the method, which is not described redundantly herein.

Figure 13:
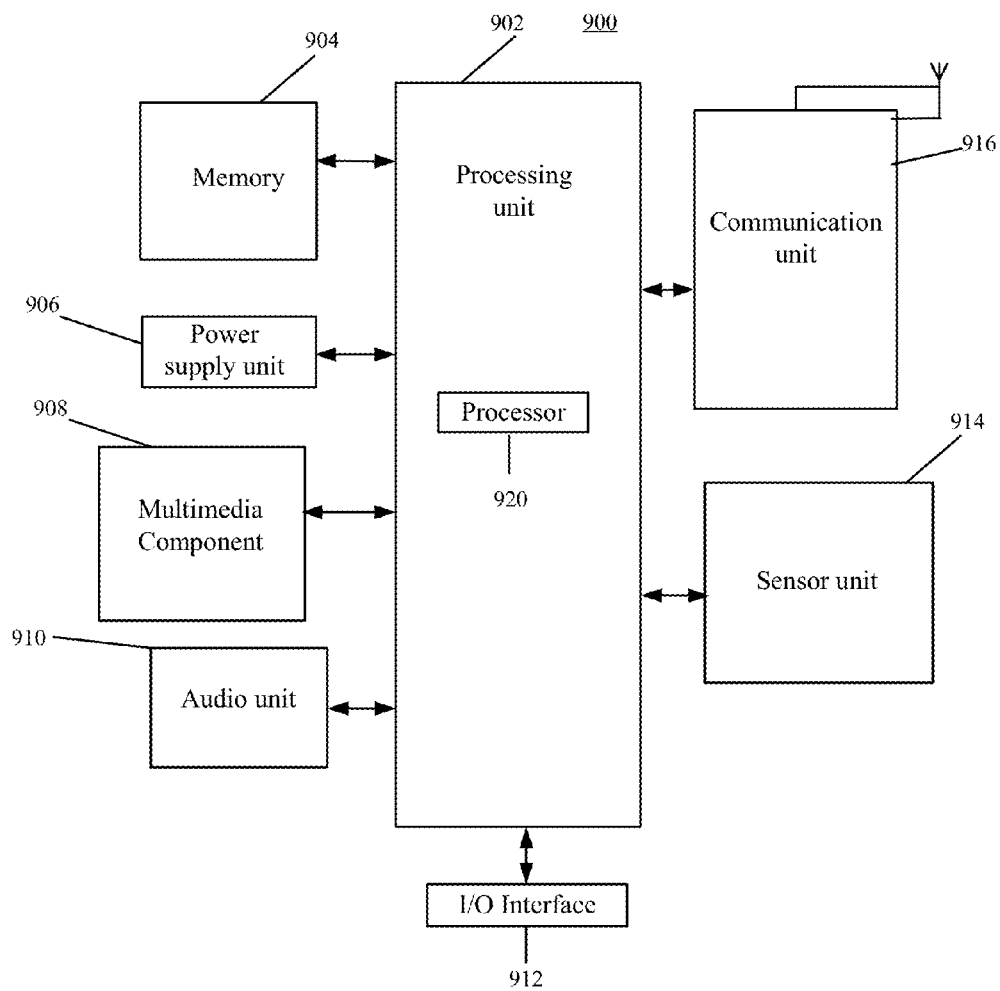
FIG. 13 is a block diagram illustrating a terminal device according to an exemplary embodiment.

FIG. 13 is a block diagram illustrating a terminal device 900 according to an exemplary embodiment. The terminal device 900 is for use in implementing the call transferring methods provided by any one of the embodiments corresponding to FIG. 1, FIG. 2 and FIG. 5. For instance, the terminal device 900 may be a mobile phone, a computer, a digital broadcasting terminal, a message receiving and dispatching device, a game console, a tablet device, a medical device, a fitness equipment, a personal digital assistance, etc.

Referring to FIG. 13, the terminal device 900 may include the following one or multiple units: a processing unit 902, a memory 904, a power supply unit 906, a multimedia unit 908, an audio unit 910, an input/output (I/O) interface 912, a sensor unit 914, and a communication unit 916.

The processing unit 902 usually controls overall operation of the terminal device 900, such as the operation relating to displaying, phone calling, digital communicating, camera operation and recording operation. The processing unit 902 may include one or multiple processer 920 to execute instruction in order to accomplish all or partial steps of the above mentioned method. In addition, the processing unit 902 may include one or multiple modules so as to process the interaction between the processing unit 902 and other units. For instance, the processing unit 902 may include a multimedia unit for easy interaction between the multimedia unit 908 and the processing unit 902.

The memory 904 is configured to store all types of data in order to support the operation on the terminal device 900. The examples of these data includes instructions of any application program or method operating on the terminal device 900, contact data, phonebook data, messages, pictures, videos, etc. The memory 904 may be realized by volatile or nonvolatile memory devices of any type or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Disk or CD.

The power supply unit 906 provides power to all units of the terminal device 900. The power supply unit 906 may includes the power supply management system, one or multiple power supplies, and other units generated for the terminal device 900 and related to managing and distributing power.

The multimedia unit 908 includes a screen provided with an output interface, which is between the terminal device 900 and the user. In some embodiments, the screen may include the Liquid Crystal Display (LCD) and a Touch Panel (TP). If the screen includes a touch panel, the screen may be realized as the touch screen to receive the input signals from the user. The touch panel includes one or multiple touch sensors for sensing the touching, sliding and hand signals on the touch panel. The touch sensor may not only sense the boundary of the movement by touching or sliding, but also detect the time of duration and pressure relating to the touching or sliding operation. In some embodiments, the multimedia unit 908 includes a front-facing camera and/or a rear camera. When the terminal device 900 is in the operating mode, such as shooting mode or video mode, the front-facing camera and/or the rear camera may receive the external multimedia data. Each front-facing camera and/or the rear camera may be a fixed optical lens system or have the capability of focusing and optical zooming.

The audio unit 910 is configured to output and/or input audio signals. For instance, the audio unit 910 includes the microphone (MIC). The microphone is configured to receive the external audio signals when the terminal device 900 is in the operating mode, such as calling mode, recording mode and voice recognition mode. The received audio signals may be further stored in the memory 904 or sent via the communication unit 916. In some embodiments, the audio unit 910 further includes the loudspeaker for outputting the audio signals.

The I/O interface 912 provides interface between the processing unit 902 and the peripheral interface module. The peripheral interface module may be keyboard, clicking wheel, button, etc. The buttons may include but not are limited to: the homepage button, the volume button, the starting-up button and the locking button.

The sensor unit 914 includes one or multiple sensors for providing the terminal device 900 with the status evaluation in all aspects. For instance, the sensor unit 914 may detect the opening/closing status of the terminal device 900 and relatively position the units. For example, the units may be the display and keypad of the terminal device 900. The sensor unit 914 may further detect the position change of the terminal device 900 or one unit of the terminal device 900, the existence or nonexistence of touching between the user and the terminal device 900, accelerating/decelerating location of the terminal device 900, and the temperature variation of the terminal device 900. The sensor unit 914 may include a proximity sensor, which is configured to detect the existence of nearby object when there is none of physical touching. The sensor unit 914 may further include the optical sensor, such as CMOS or CCD image sensor for use in imaging application. In some embodiments, the sensor unit 914 may further includes the acceleration sensor, the gyro sensor, the magnetic sensor, the pressure sensor or the temperature sensor.

The communication 916 is configured to easy communicate by wire or wireless method between the terminal device 900 and other devices. The terminal device 900 may input the wireless network such as WiFi, 2G or 3G, or their combination basing on the communication standard. In one exemplary embodiment, the communication 916 receives the broadcasting signals or broadcasting relative information from external broadcasting management system via the broadcasting channel. In one exemplary embodiment, the communication 916 further includes the near field communication (NFC) module in order to promote the short-range communication. For instance, the NFC module may be realized basing on radio frequency identification (RFID) technology, infra-red data association (IrDa) technology, ultra wide band (UWB) technology, blue tooth (BT) technology and other technologies.

In the exemplary embodiment, the terminal device 900 may be realized by one or multiple application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, for implementing the call transferring method provided by any one of the embodiments corresponding to FIG. 1, FIG. 2 and FIG. 5.

The terminal device provided by the present disclosed embodiment detects if the incoming call is received, displays the incoming call interactive interface containing the incoming call transferring option after detecting the incoming call is detected, and transfers the incoming call to the terminal device corresponding to the designated number when the incoming call transferring option is chosen. As the user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

In the exemplary embodiment, a non-transitory computer-readable storage medium containing instructions is further provided, such as the memory 904 containing instructions. The above mentioned instructions may be implemented by the processor 920 of the terminal 900 to achieve the method. For instance, the non-transitory computer-readable storage medium may be ROM, random access memory (RAM), CD-ROM, disk, floppy disk, optical data storage device, etc.

A non-transitory computer-readable storage medium enables the terminal device to perform a method for transferring a telephone call when the instructions of the storage medium are executed by the processor of the terminal device. The method includes:

Detecting if the incoming call is received;

Displaying the incoming call interactive interface containing the incoming call transferring option, if the incoming call is detected;

Transferring the incoming call to the terminal device corresponding to the designated number when the incoming call transferring option is chosen.

The computer readable storage medium provided by the present disclosed embodiment detects if the incoming call is received, displays the incoming call interactive interface containing the incoming call transferring option after detecting the incoming call is detected, and transfers the incoming call to the terminal device corresponding to the designated number when the incoming call transferring option is chosen. As the user is allowable to choose whether the incoming call should be transferred according to actual needs, the problem of automatically transferring incoming calls under some circumstances not suitable for transferring a telephone call may be avoided, thereby achieving more intelligent call transfer manner with more flexibility and better effect for transferring a telephone call.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method for transferring a telephone call, comprising:
   detecting if an incoming call is received;
   displaying an incoming call interactive interface containing an incoming call transferring option, if the incoming call is detected; and
   displaying a designated number obtaining interface comprising one or more preset numbers when the incoming call transferring option is chosen, wherein the one or more preset numbers are obtained by displaying a preset number input box and obtaining the one or more preset numbers inputted by the user in the preset number input box;
   detecting a number chosen by the user from the one or more preset numbers displayed on the designated number obtaining interface; and
   determining the number chosen by the user as the designated number;
   transferring the incoming call to a terminal device corresponding to a designated number.

2. The method according to claim 1, further comprising:
   displaying a designated number obtaining interface, wherein the designated number obtaining interface comprises a number input box;
   obtaining a number inputted by a user in the number input box of the designated number obtaining interface; and
   determining the number inputted by the user as the designated number.

3. The method according to claim 1, wherein obtaining the one or more preset numbers comprises:
   displaying numbers included in the user's contacts; and
   determining the number chosen by the user from the numbers contained in the contacts as the preset number.

4. A terminal device for transferring a telephone call, comprising:
   a processor; and
   a memory configured to store instructions executable by the processer,
   wherein the processer is configured to perform:
   detecting if an incoming call is received;
   displaying an incoming call interactive interface containing an incoming call transferring option, if the incoming call is detected; and
   displaying a designated number obtaining interface comprising one or more preset numbers when the incoming call transferring option is chosen, wherein the one or more preset numbers are obtained by displaying a preset number input box and obtaining the one or more preset numbers inputted by the user in the preset number input box;
   detecting a number chosen by the user from the one or more preset numbers displayed on the designated number obtaining interface; and
   determining the number chosen by the user as the designated number;
   transferring the incoming call to a terminal device corresponding to a designated number.

5. The terminal device according to claim 4, wherein the processor is configured to further perform:
   displaying a designated number obtaining interface, wherein the designated number obtaining interface comprises a number input box;
   obtaining a number inputted by a user in the number input box of the designated number obtaining interface; and
   determining the number inputted by the user as the designated number.

6. The terminal device according to claim 4, wherein obtaining the one or more preset numbers comprises:
   displaying numbers included in the user's contacts; and
   determining the number chosen by the user from the numbers contained in the contacts as the preset number.

7. A non-transitory computer-readable storage medium comprising instructions, executable by a processor in a terminal device, for performing a method for transferring a telephone call, the method comprises:
   detecting if an incoming call is received;
   displaying an incoming call interactive interface containing an incoming call transferring option, if the incoming call is detected; and
   displaying a designated number obtaining interface comprising one or more preset numbers when the incoming call transferring option is chosen, wherein the one or more preset numbers are obtained by displaying a preset number input box and obtaining the one or more preset numbers inputted by the user in the preset number input box;
   detecting a number chosen by the user from the one or more preset numbers displayed on the designated number obtaining interface; and
   determining the number chosen by the user as the designated number;
   transferring the incoming call to a terminal device corresponding to a designated number.

8. The non-transitory storage medium according to claim 7, the method further comprising:
   displaying a designated number obtaining interface, wherein the designated number obtaining interface comprises a number input box;
   obtaining a number inputted by a user in the number input box of the designated number obtaining interface; and
   determining the number inputted by the user as the designated number.

* * * * *